March 15, 1966      A. N. ORMOND      3,240,454

SPACE CENTER OMNI-DIRECTIONAL LINEAR MOUNTING APPARATUS

Filed Sept. 12, 1963

INVENTOR.
ALFRED N. ORMOND

BY *Elliott & Pastoriza*
ATTORNEYS.

United States Patent Office 3,240,454
Patented Mar. 15, 1966

3,240,454
SPACE CENTER OMNI-DIRECTIONAL LINEAR
MOUNTING APPARATUS
Alfred N. Ormond, 11969 E. Riviera Road,
Santa Fe Springs, Calif.
Filed Sept. 12, 1963, Ser. No. 308,494
3 Claims. (Cl. 248—5)

This invention relates generally to mounting structures and more particularly, to a novel means for mounting a member for linear omni-directional movement in a spherical surface whose center is a point in space normally falling outside of the mounting structure.

Conventional mountings such as gimbals generally take the form of interconnected rings havings axes of rotation at right angles to each other so that a member supported on an inner ring can effect universal rotational movements with respect to a stationary structure mounting the outer ring. In many applications, it is only required that a member be capable of small omni-directional or tilting movements in a spherical surface about a given point. For example, rocket engine outlet nozzles may be mounted for tilting movement with respect to a given point to enable the thrust direction to be varied. The particular point, such as the throat of the rocket engine nozzle structure, however, is not always accessible for conventional type gimbal structures to effect a proper mounting of the nozzle structure.

With the foregoing in mind, it is a primary object of the present invention, to provide a novel mounting structure for supporting a member for tilting movement with respect to a point in space located wholly outside the structure to the end that movement about any fixed point in space may be effected even though such point is relatively inaccessible.

Another object of this invention is to provide a novel space mounting particularly adapted for mounting rocket engines which is considerably simpler and more economical to manufacture than conventional type gimbal structures.

Still another object of this invention is to provide an improved mounting structure for enabling movement of a member relative to a point fixed in space outside of the mounting structure itself so that any appreciable modifications or changes in a body to which the structure is mounted are avoided.

Briefly, these and many other objects and advantages of this invention are attained by providing first and second frames or supports adapted, respectively, to be secured to a member and a body in spaced relationship to a fixed point in the body about which the member is to be movable. A plurality of means such as rods extend between the first and second frames with their ends secured to these frames by universal flexures. The plurality of rods are positioned to converge towards each other in a direction from the first frame towards the second frame such that the projection of their elongated axes intersect at a single point in space. This point in space corresponds to the center of a spherical surface about which linear omni-directional tilting movements of the member can take place. By this arrangement, the point about which movement takes place is isolated in space outside of the mounting structure and can thus correspond to a desired location which might be inaccessible, such as the throat area of a rocket engine.

In the preferred form of the invention, first and second frames take the form of annular ring structures lying in spaced parallel planes, the axis of these rings passing through the fixed point in space. The elongated interconnected means or rods themselves are uniformly circumferentially spaced about this axis and are all of equal length.

A better understanding of the invention will be had by referring to a preferred embodiment thereof as illustrated in the accompanying drawings, in which.

Figure 1:
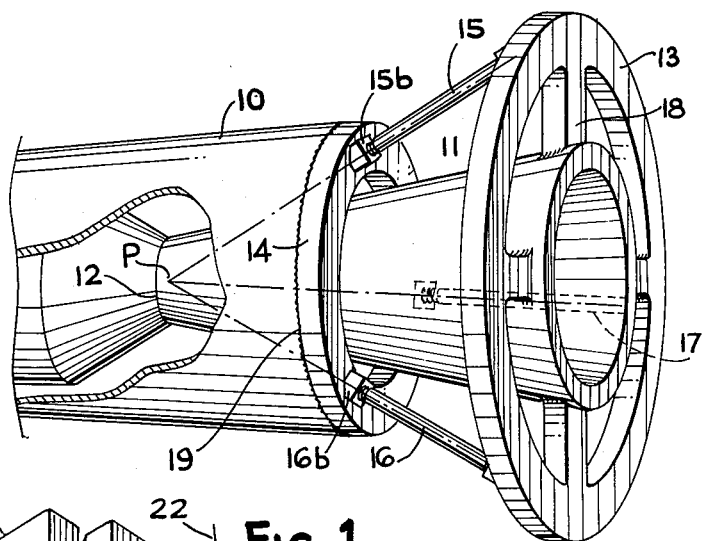
FIGURE 1 illustrates the novel mounting of this invention for supporting the tail pipe exhaust portion of a rocket engine with respect to a missile body so that the engine may tilt relative to the body to change the direction of thrust.

Referring first to FIGURE 1, there is shown a portion of a missile body 10 from which extends a rocket nozzle 11. The nozzle 11 has its throat area 12 disposed within the body 10. In order to change the direction of thrust, it is most desirable to enable the nozzle 11 to tilt about a point P corresponding to the throat area 12 of the nozzle. Since this throat area is disposed within the missile body portion 10, conventional gimbaling systems for mounting the nozzle relative to the missile body 10 for movement about this point have heretofore been relatively bulky and required considerable modification of the missile body structure.

In accordance with the present invention, desired movement of the nozzle 11 about the point P may be effected without requiring access to the throat area 12. As shown, the mounting structure for this purpose includes a first frame means or support 13 and a second frame means or support 14, preferably in the form of rings. Extending between the first and second supports 13 and 14 are a plurality of interconnecting means which may comprise elongated rods such as indicated at 15, 16, and 17. The first support ring 13 is rigidly secured to the nozzle 11 as by suitable radially directed spider webs 18. The second support ring 14 is in turn rigidly secured as by welding at 19, to the missile body 10.

Figure 2:
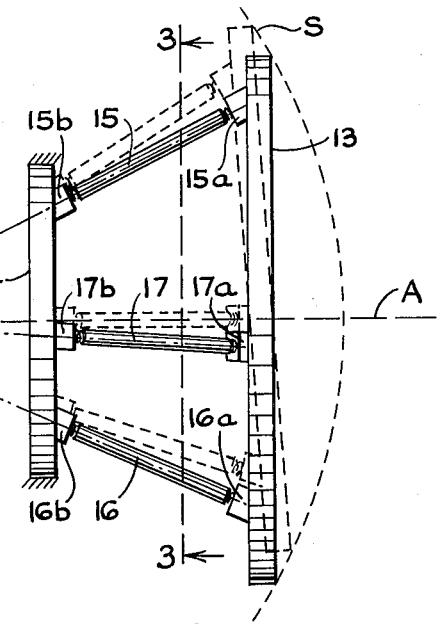
FIGURE 2 is a side elevational view of the structure itself.

As shown most clearly in FIGURE 2, the various rods 15, 16, and 17, extending from the support 13 towards the support 14 converge towards each other such that the projection of their elongated axes all intersect at the point P. The ends of the respective rods in turn are secured to the supports 13 and 14 by universal flexures such as indicated at 15a and 15b for the rod 15, 16a and 16b for the rod 16, and 17a and 17b for the rod 17. These universal flexures may be of the type shown in my United States Patent No. 2,966,049, entitled Universal Flexure. Universal flexures of this type permit linear tilting movements but constrain the attached rods against torsional or twisting movements.

The rods 15, 16, and 17 are all of equal lengths and converge uniformly so that the various end universal flexures will be equally radially spaced from a straight line axis drawn from the point P and coincident with the central axis of the support rings 13 and 14.

Figure 3:
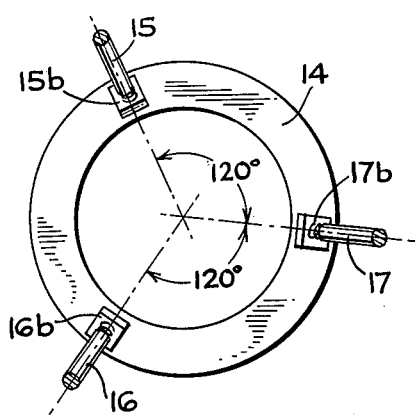
FIGURE 3 is a cross-section taken in the direction of the arrows 3—3 of FIGURE 2; and, FIGURE 4 is an enlarged perspective view of one of the flexures of FIGURE 1.

FIGURE 3 illustrates the equal circumferential spacing of the support rods. In the case of three rods such as illustrated, this spacing will be 120 degrees with respect to the straight line axis A shown in FIGURE 2.

Figure 4:
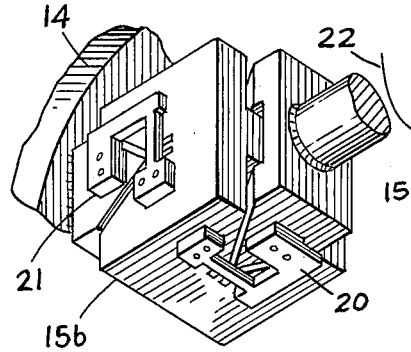

With the foregoing arrangement, the support 13 may move in a spherical surface indicated by the dashed line S in FIGURE 2, the center of this sphere corresponding with the point P. Partial movement is indicated by the dotted line representation. The various universal flexures at the ends of the rods accommodate the change in relative position of the frame supports 13 and 14 but constrain the frames against torsional or twisting movements relative to each other about the axis A. Further, the flexures maintain the distance between the points of connection on the opposite ends of each rod constant. For example, in the flexure 15b shown in enlarged view in FIGURE 4, the side plate stabilizing flexures such as shown at 20 and 21 prevent relative twisting in the directions of the double headed arrow 22 while the orientation of the planes of the main flexure webs prevents elongation of the connection.

With the first frame support 13 secured to the nozzle 11 as depicted in FIGURE 1, it will accordingly be evident that the nozzle 11 may execute tilting movements about the point P, this point in space being wholly exterior to the mounting structure itself.

The particular location of the point P may be varied by changing the angle of convergence of the various support rods 15, 16, and 17. Further, while only three support rods have been shown, a plurality of such rods all of equal length and uniformly circumferentially distributed about the axis A may be provided.

From the foregoing description, it will be evident that the present invention has provided a greatly improved mounting system. Minor changes falling within the scope and spirit of this invention will occur to those skilled in the art. The mounting structure is therefore not to be thought of as limited to the exact embodiment set forth merely for illustrative purposes.

What is claimed is:

1. A space center mounting structure for supporting a member for linear omni-directional tilting movements in a given spherical surface having a center in space in a body at a fixed distance from the mounting structure comprising, in combination: a first frame means secured to said member; a second frame means secured to said body; and a plurality of elongated rods of equal length extending from said first frame means towards said second frame means and converging towards each other so that the projected axes of said rods intersect at a single point in space coincident with said center, the opposite ends of each of said rods terminating in universal flexure means for connection respectively to said first and second frame means, each of said flexures means constraining said rods against torsional movements relative to said frame means, and maintaining the points of connection of the opposite ends of each rod at a constant distance from each other.

2. A space center mounting structure according to claim 1, in which said first and second frame means are ring-shaped and are positioned in parallel planes, said universal flexure means being equally radially spaced from a straight line axis normal to said planes and passing through said single point and being uniformly circumferentially spaced about said straight line axis.

3. A space center gimbal according to claim 2, in which said plurality of rods are three in number circumferentially spaced at 120 degrees to each other.

References Cited by the Examiner

UNITED STATES PATENTS

| | | | |
|---|---|---|---|
| 1,750,016 | 3/1930 | Meyer | 248—18 X |
| 1,760,286 | 5/1930 | Schaum | 248—18 X |
| 2,583,579 | 1/1952 | Lodge | 248—18 X |
| 2,711,297 | 6/1955 | Thiele | 248—18 |
| 2,761,638 | 9/1956 | Getline | 248—5 |
| 2,966,049 | 12/1960 | Ormond | 64—15 |

FOREIGN PATENTS 851,349  10/1960  Great Britain.

CLAUDE A. LE ROY, *Primary Examiner.*